United States Patent
Choi et al.

(10) Patent No.: US 10,894,506 B2
(45) Date of Patent: Jan. 19, 2021

(54) VEHICLE LAMP

(71) Applicant: SL Corporation, Daegu (KR)

(72) Inventors: Nak Jung Choi, Gyeongsan-si (KR); Jong Woon Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/530,288

(22) Filed: Aug. 2, 2019

(65) Prior Publication Data
US 2020/0207257 A1     Jul. 2, 2020

(30) Foreign Application Priority Data

Dec. 27, 2018 (KR) .................. 10-2018-0170735

(51) Int. Cl.
| | |
|---|---|
| *B60Q 1/26* | (2006.01) |
| *B60Q 3/18* | (2017.01) |
| *B60Q 3/85* | (2017.01) |
| *H02J 7/00* | (2006.01) |
| *B60Q 11/00* | (2006.01) |

(52) U.S. Cl.
CPC .............. *B60Q 1/2607* (2013.01); *B60Q 3/18* (2017.02); *B60Q 3/85* (2017.02); *B60Q 11/007* (2013.01); *H02J 7/0021* (2013.01); *H02J 7/0047* (2013.01); *H02J 7/0048* (2020.01); *H02J 7/0049* (2020.01)

(58) Field of Classification Search
CPC .......... B60Q 1/2607; B60Q 3/18; B60Q 3/85; B60Q 11/007; B60Q 1/2696; B60Q 1/04; H02J 7/0021; H02J 7/0047
See application file for complete search history.

(56) References Cited

U.S. PATENT DOCUMENTS

| | | | |
|---|---|---|---|
| 6,769,777 B1 * | 8/2004 | Dubin ................ | F21V 5/04 353/38 |
| 7,461,960 B2 | 12/2008 | Opolka et al. | |
| 10,232,763 B1 * | 3/2019 | Eckstein ............ | F21S 41/147 |
| 2014/0063805 A1 * | 3/2014 | Song ................. | F21S 41/143 362/249.01 |

(Continued)

FOREIGN PATENT DOCUMENTS

| | | |
|---|---|---|
| AT | 517885 A1 | 5/2017 |
| DE | 202006020378 U1 | 5/2008 |

OTHER PUBLICATIONS

Office Action, German Patent Application 10 2019 213 502.1, dated Nov. 26, 2020, 16 pages.

*Primary Examiner* — Jong-Suk (James) Lee
*Assistant Examiner* — Christopher E Dunay
(74) *Attorney, Agent, or Firm* — Nelson Mullins Riley & Scarborough LLP; Kongsik Kim, Esq.

(57) ABSTRACT

Provided is to a vehicle lamp capable of ensuring a high sense of unity when a plurality of lamp units are arranged based on a shape of an outer optical member. The vehicle lamp includes a light source unit for generating light, a first optical member in which a plurality of incident optics are disposed on an incident surface, a second optical member in which a plurality of emitting optics are disposed, and a shield unit disposed between the plurality of incident optics and the plurality of emitting optics. In particular, a first side of the incident surface and the emitting surface is formed to be closer to the light source unit than a second side of the incident surface and the emitting surface to allow the incident surface and the emitting surface to be inclined.

18 Claims, 13 Drawing Sheets

(56) References Cited

U.S. PATENT DOCUMENTS

| | | | |
|---|---|---|---|
| 2015/0345742 A1 | 12/2015 | Radl et al. | |
| 2016/0010811 A1* | 1/2016 | Benitez | F21S 41/43 |
| | | | 362/509 |
| 2016/0265733 A1* | 9/2016 | Bauer | F21S 41/151 |
| 2018/0320852 A1* | 11/2018 | Mandl | F21S 41/43 |
| 2018/0335191 A1* | 11/2018 | Stefanov | F21S 41/16 |
| 2019/0072252 A1* | 3/2019 | Moser | F21S 41/151 |
| 2020/0080704 A1* | 3/2020 | Kim | B60Q 1/0011 |

* cited by examiner

Related Art

Related Art

Related Art

VEHICLE LAMP

CROSS-REFERENCE TO RELATED APPLICATION

This application claims the benefit of priority from Korean Patent Application No. 10-2018-0170735 filed on Dec. 27, 2018, which application is herein incorporated by reference in its entirety.

BACKGROUND

1. Technical Field

The present disclosure relates to a vehicle lamp, and more particularly to a vehicle lamp capable of ensuring a high sense of unity when a plurality of lamp units are arranged based on a shape of an outer optical member.

2. Description of the Related Art

Generally, a vehicle is equipped with various types of vehicle lamps having an illumination function for confirming an object disposed in the vicinity of the vehicle at low light condition driving (e.g., at night), and a signaling function for notifying other vehicle or road users of the running state of the vehicle. For example, the main purpose of head lamps and fog lamps is the illumination function, and the main purpose of turn signal lamps, tail lamps, brake lamps, or side markers is the signaling function. In addition, the installation standards and specifications of such vehicle lamps are stipulated by regulations to allow each function to be fully utilized.

Among vehicle lamps, the head lamp forms various beam patterns such as a low beam pattern or a high beam pattern to secure a front view of a driver at low light condition driving, and it plays an important role for safe operations. The low beam pattern forms a predetermined cutoff line to prevent the occurrence of glare to a driver of a front vehicle such as a preceding vehicle or an opposite vehicle.

Recently, studies have been actively conducted to reduce the size of the vehicle lamp using a microlens having a relatively short focal length. When the low beam pattern is formed using a plurality of micro-optics provided on an optical member, the low beam pattern is formed by light emitted from the plurality of micro-optics, and a plurality of shields are provided to obstruct a part of light incident on each of the plurality of micro-optics to form a cutoff line.

As shown in FIG. 1, an outer lens 20 through which light is ultimately emitted may be formed in various shapes such as a curvature or the like based on a position where the lamp is mounted on the vehicle and the design of the vehicle. In this case, a plurality of lamp units 30 may be arranged in a stepwise manner based on a shape of the outer lens 20. However, the sense of unity is reduced and a lighting image may not be uniform due to the stepwise arrangement.

SUMMARY

The problems to be solved by the present disclosure are to provide a vehicle lamp in which the lamp is formed to incline at an incident surface of a first optical member and at an emitting surface of a second optical member. The problems of the present disclosure are not limited to the above-mentioned problems, and other problems not mentioned may be clearly understood by a person skilled in the art from the following description.

According to an aspect of the present invention, there is provided a vehicle lamp including a light source unit for generating light, a first optical member in which a plurality of incident optics are disposed on an incident surface on which light is incident from the light source unit, a second optical member in which a plurality of emitting optics are disposed on an emitting surface through which light emitted from the first optical member is incident and emitted, and a shield unit disposed between the plurality of incident optics and the plurality of emitting optics. In particular, a first side of the incident surface and the emitting surface may be formed to be closer to the light source unit than a second side of each of the incident surface and the emitting surface to allow the incident surface and the emitting surface to be inclined.

A vehicle lamp according to an exemplary embodiment of the present disclosure may have one or more of the following benefits. By forming optical axes of the plurality of incident optics and the plurality of emitting optics disposed on the inclined surface and the emitting surface in parallel with an optical axis of the light source, beam patterns may be more efficiently formed.

The benefits of the present disclosure are not limited to the above-mentioned benefits, and other benefits not mentioned may be clearly understood by a person skilled in the art from the claims.

DETAILED DESCRIPTION

Figure 1:
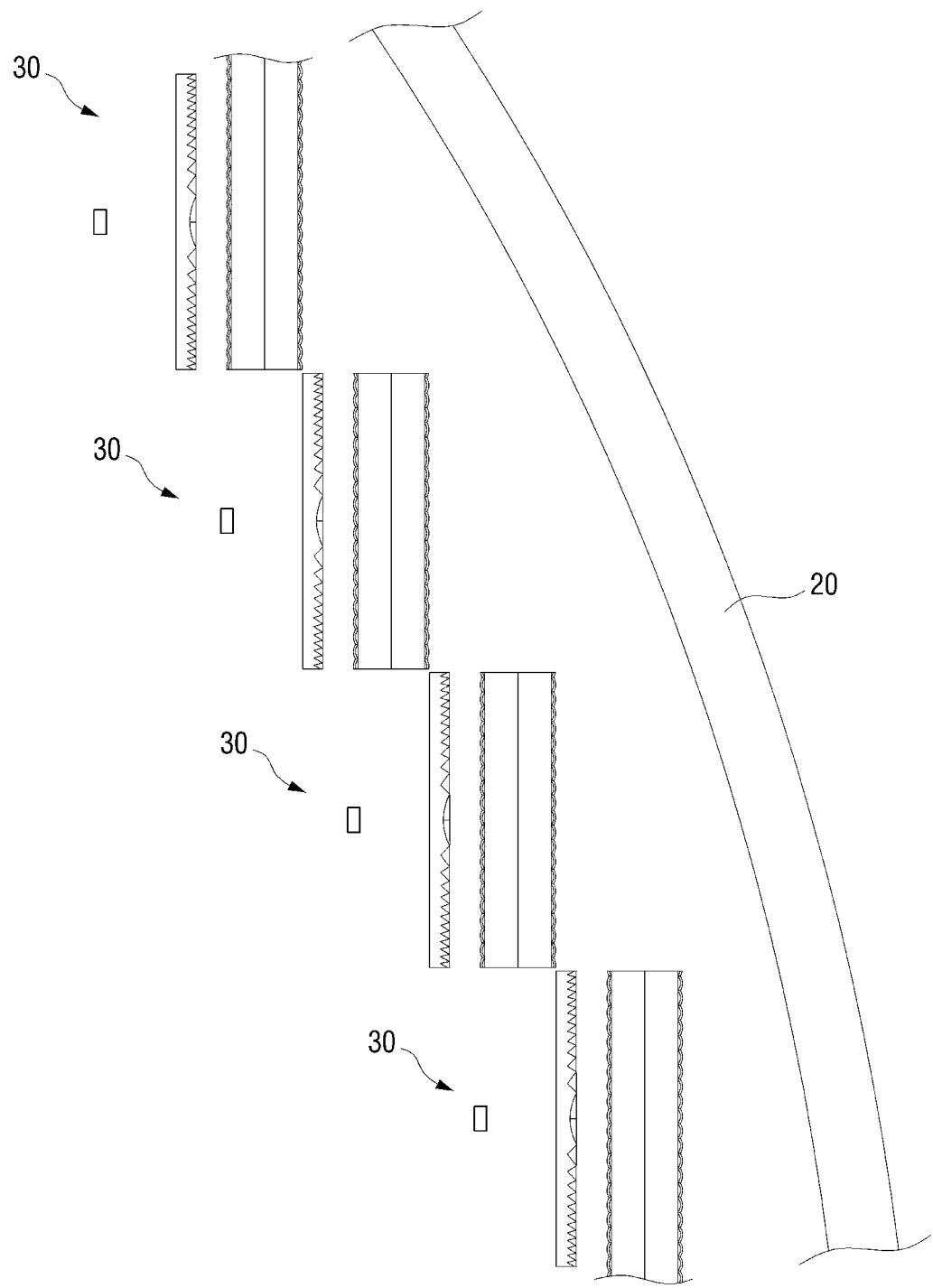
FIG. 1 is a view showing a conventional vehicle lamp of related art.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present disclosure will only be defined by the appended claims. Throughout the specification, like reference numerals in the drawings denote like elements.

In some embodiments, well-known steps, structures and techniques will not be described in detail to avoid obscuring the invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure are described herein with reference to plan and cross-section illustrations that are schematic illustrations of exemplary embodiments of the present disclosure. As such, variations from the shapes of the illustrations as a result, for example, of manufacturing techniques and/or tolerances, are to be expected. Thus, exemplary embodiments of the present disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, exemplary embodiments of a vehicle lamp according to the present disclosure will be described in detail with reference to the accompanying drawings.

Figure 2:
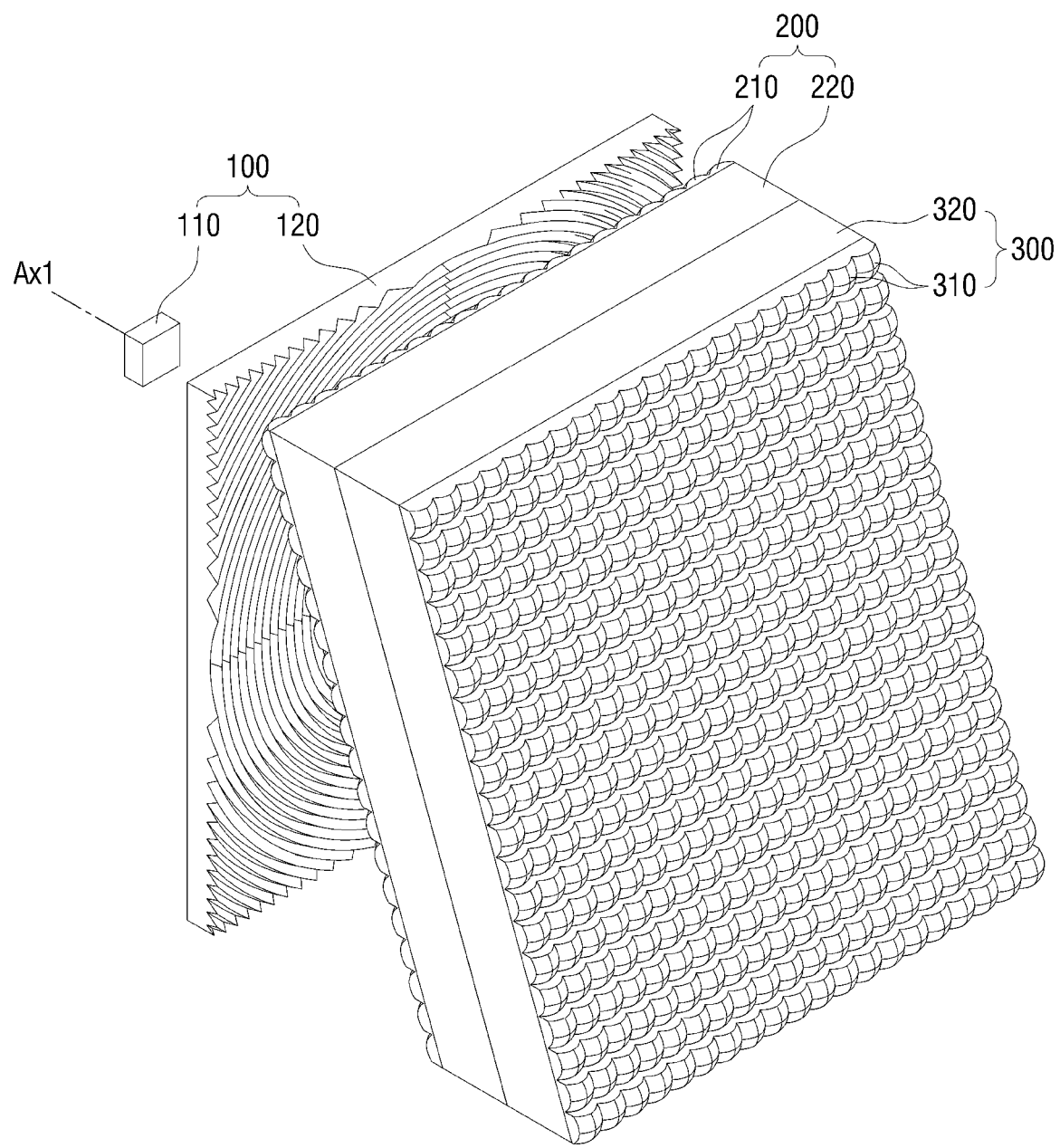
FIGS. 2 and 3 are perspective views showing a vehicle lamp according to an exemplary embodiment of the present disclosure.
Figure 3:
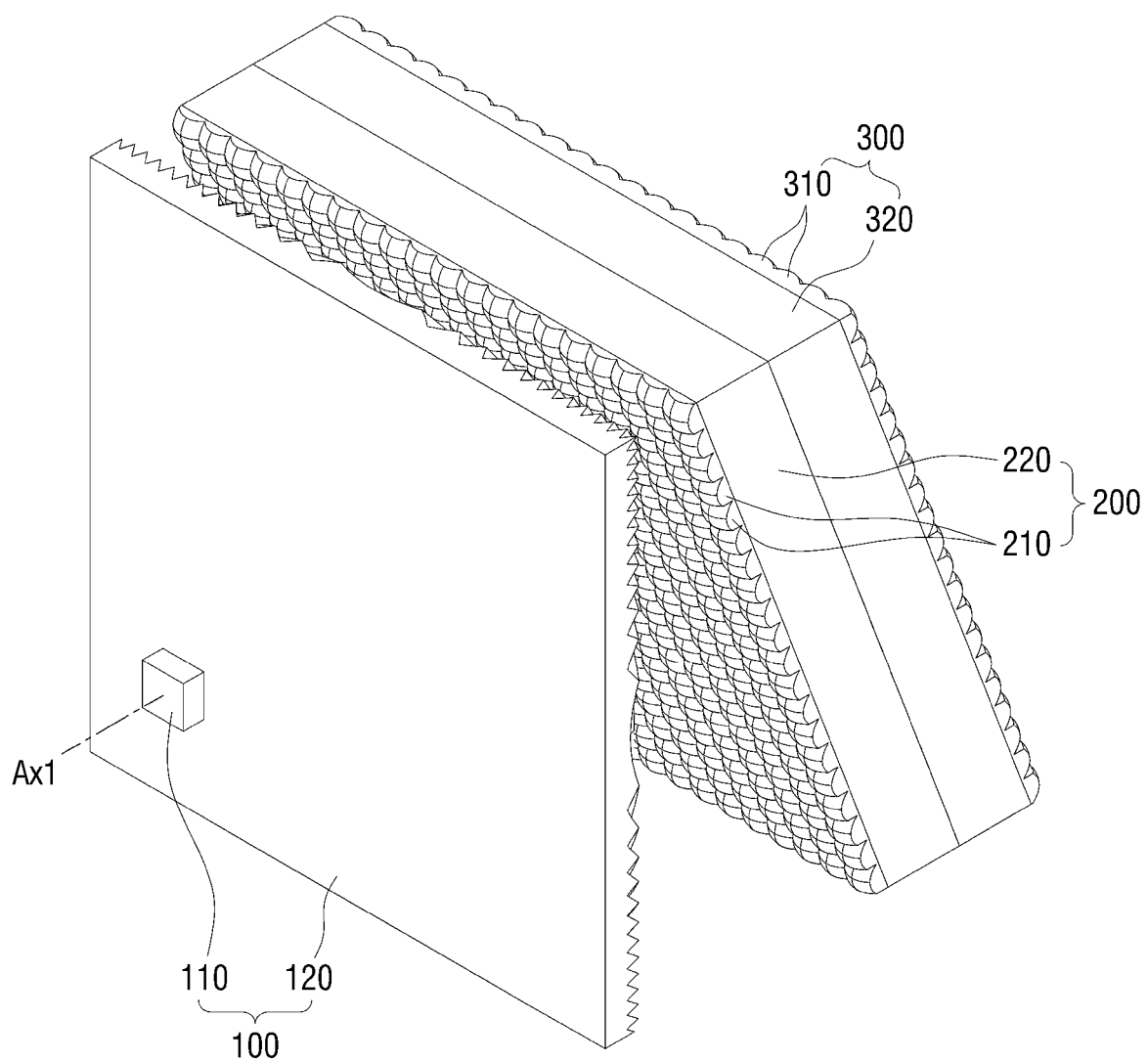
Figure 4:
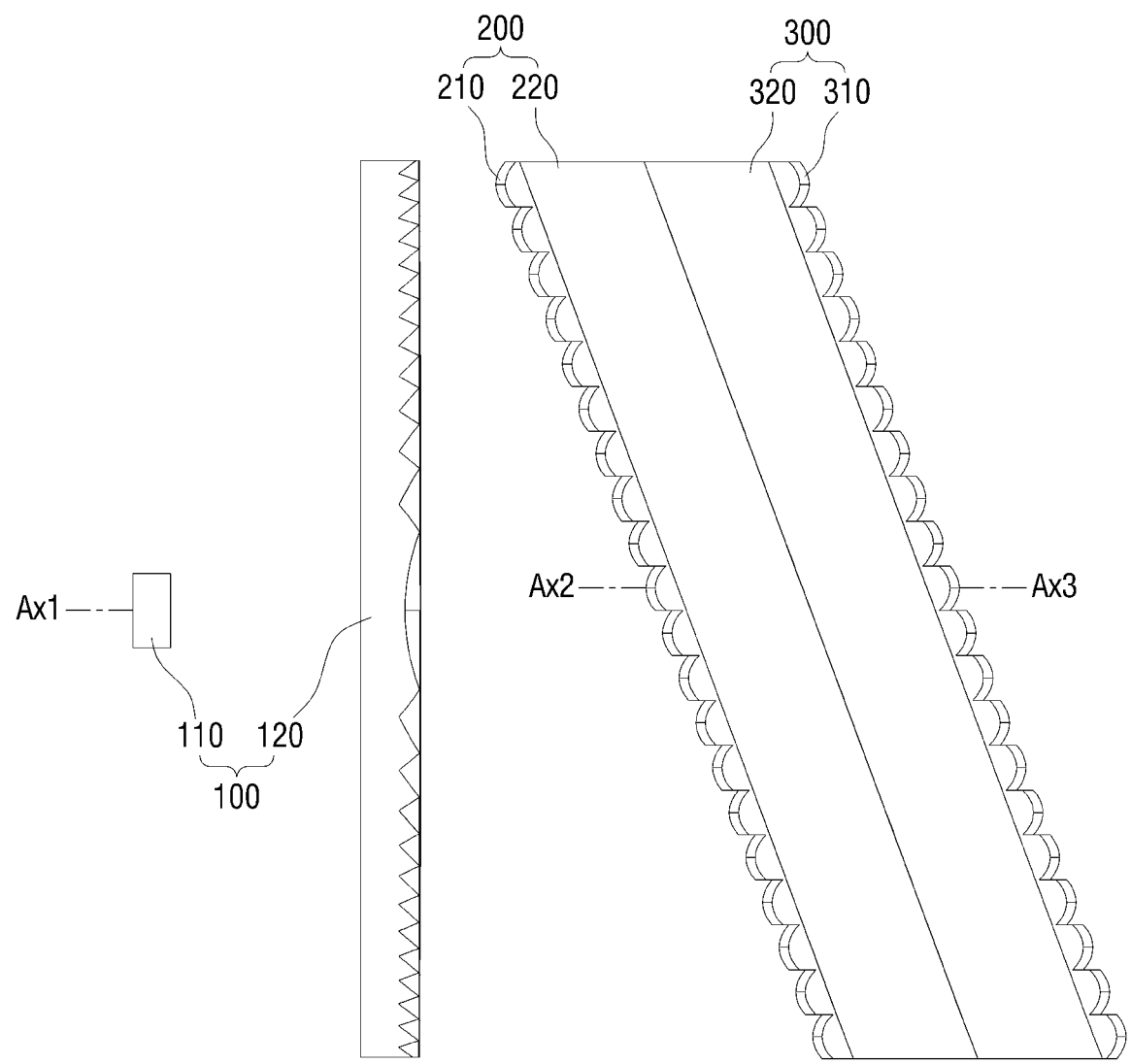
FIG. 4 is a side view showing a vehicle lamp according to an exemplary embodiment of the present disclosure.
Figure 5:
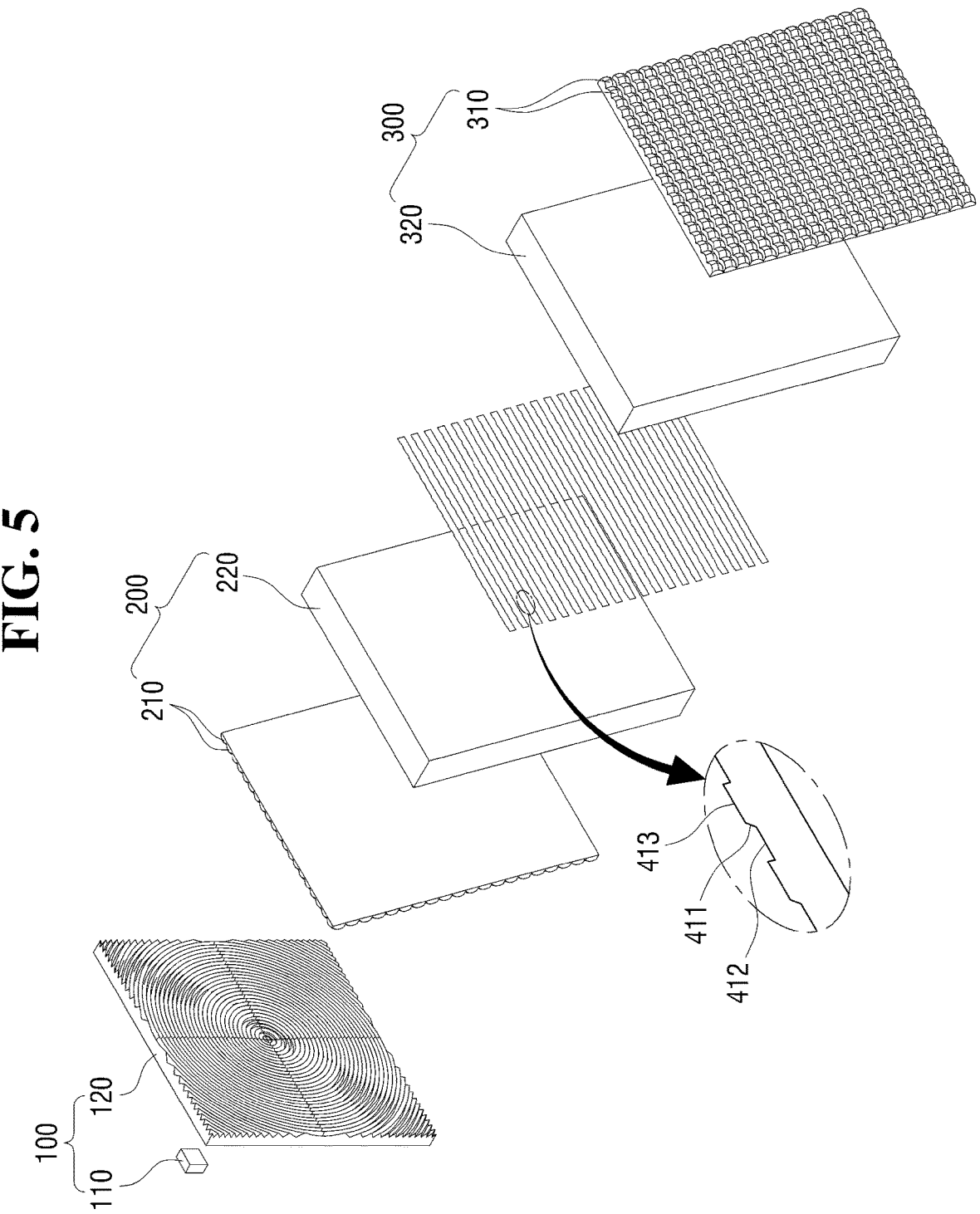
FIGS. 5 and 6 are exploded views showing a vehicle lamp according to an exemplary embodiment of the present disclosure.
Figure 6:
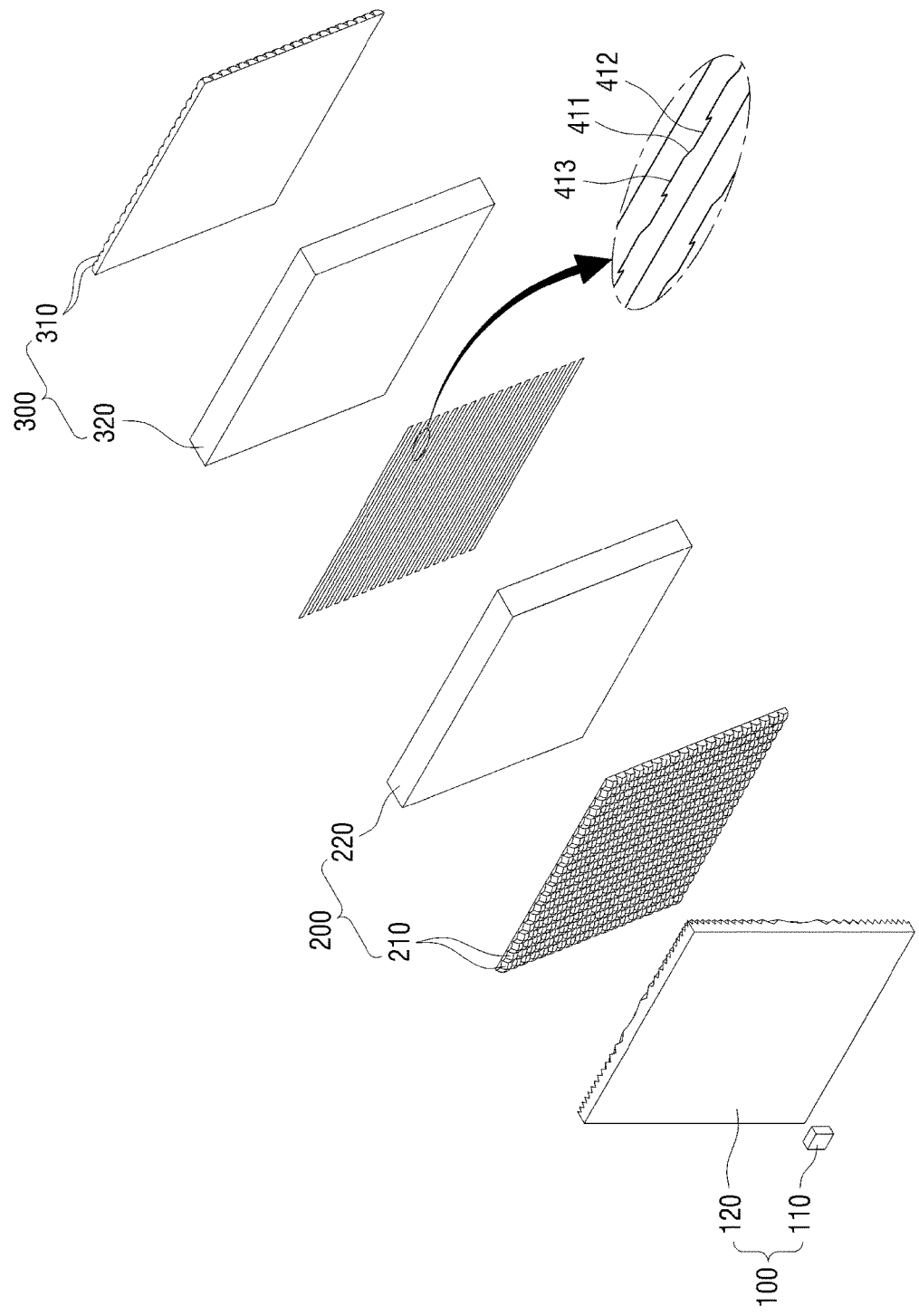

FIGS. 2 and 3 are perspective views showing a vehicle lamp according to an exemplary embodiment of the present disclosure. FIG. 4 is a side view showing a vehicle lamp according to an exemplary embodiment of the present disclosure. FIGS. 5 and 6 are exploded views showing a vehicle lamp according to an exemplary embodiment of the present disclosure.

In an exemplary embodiment of the present disclosure, the vehicle lamp may be a head lamp that is used for the purpose of securing a front view by irradiating light in a driving direction of a vehicle when the vehicle drives at night or in a dark place such as a tunnel or the like. However, the vehicle lamp according to an exemplary embodiment of the present disclosure is not limited thereto, and it may be used not only as the head lamp but also as various lamps installed in a vehicle such as a tail lamp, a brake lamp, a fog lamp, a position lamp, a turn signal lamp, a daytime driving, a backup lamp, or the like.

Further, when the vehicle lamp is used as the head lamp in an exemplary embodiment of the present disclosure, the vehicle lamp will be exemplified for the case where it forms a low beam pattern that prevents light from being irradiated on an upper side based on a predetermined cutoff line to prevent the occurrence of glare to a driver of a front vehicle such as a preceding vehicle or an opposite vehicle. However, this is merely an example for facilitating understanding of the present disclosure. The vehicle lamp of the present disclosure is not limited thereto, and various beam patterns may be formed based on the usage, and two or more beam patterns may be formed simultaneously.

Referring to FIGS. 2 to 6, the vehicle lamp according to an exemplary embodiment of the present disclosure may include a light source unit 100, a first optical member 200, a second optical member 300, and a shield unit 400. The light source unit 100 may include a light source 110 and a light guide 120. As an example, the light source 110 may a semiconductor light emitting device such as an LED. However, the light source 110 is not limited thereto, and a semiconductor light emitting device and various other types of light sources such as a bulb may be used as the light source 110. Depending on the type of the light source 110, a reflector or the like for reflecting light generated from the light source 110 to the first optical member 200 may be additionally used.

The light guide 120 may guide an optical path of light generated at a predetermined light irradiation angle from the light source 110 in order to adjust the angle to be parallel to an optical axis Ax1 of the light source 110, and to guide the optical path to the first optical member 200. The optical axis Ax1 of the light source 110 may be understood as a line that passes perpendicularly to a center of a light emitting surface of the light source 110, and the optical axis of the light source unit 100 may be understood as an optical axis Ax1 of the light source 110.

The light guide 120 may reduce light loss by allowing light generated from the light source 110 to be incident on the first optical member 200 by a maximum amount. Further, the light guide 120 may serve to adjust the optical path to allow the light incident on the first optical member 200 to be parallel to the optical axis Ax1 of the light source 110, thereby allowing the light to be uniformly incident on the overall first optical member 200.

In an exemplary embodiment of the present disclosure, the light guide 120 may be a Fresnel lens having multiple annular lenses, and thus, it may be adjusted to allow the optical path of light generated from the light source 110 to be parallel to the optical axis Ax1 of the light source 110 while reducing the thickness. However, the light guide 120 is not limited thereto, and various types of lenses capable of adjusting the optical path of light generated from the light source 110 such as a collimator lens may be used. Although the exemplary embodiment of the present disclosure has been exemplified for the case where the light generated from the light source 110 is formed as parallel light by the light guide 120 and guided to the first optical member 200, the light guide 120 may be omitted depending on the type and number of the light source 110 or the like.

The first optical member 200 may be disposed in front of the light source unit 100 and may serve to emit the light incident from the light source unit 100 to the second optical member 300 disposed in front of the first optical member 200. In the first optical member 200, a plurality of incident optics 210 may be formed on an incident surface on which the light generated from the light source unit 100 is incident. The plurality of incident optics 210 may be disposed on the incident surface of a first light transmitting unit 220 of the first optical member 200.

Further, a first side of the incident surface of the first light transmitting unit 220 may be formed to be closer to the light source unit 100 than a second side to allow the incident surface of the first light transmitting unit 220 to be inclined.

However, the present disclosure is not limited thereto, and the first light transmitting unit 220 may be parallel to the light source unit 100.

In an exemplary embodiment of the present disclosure, the plurality of incident optics 210 may be a microlens having a relatively short focal length to reduce the overall size of the vehicle lamp of the present disclosure. Herein, the description "the first optical member 200 is disposed in front of the light source 100" may mean that the direction in which light is irradiated from the vehicle lamp of the present disclosure is forward. Therefore, the actual direction referred to may vary depending on a position and/or direction in which the vehicle lamp of the present disclosure is installed.

The plurality of incident optics 210 may be made of a material through which light is transmitted and may be disposed on the incident surface of the first light transmitting unit 220 that faces the light source unit 100. The plurality of incident optics 210 may be formed integrally with the first light transmitting unit 220. Alternatively, the plurality of incident optics 210 may be formed separately from the first light transmitting unit 220 and disposed or coupled on a surface that faces the light source portion 100 in the first light transmitting unit 220.

In an exemplary embodiment of the present disclosure, each of the plurality of incident optics 210 may be a substantially semi-cylindrical lens that extends in a horizontal (e.g., left-and-right) direction. In the plurality of incident optics 210, at least one incident optic disposed in the horizontal direction may form a row in the horizontal direction, and the row in the horizontal direction may be disposed in a vertical (e.g., up-and-down) direction. When the incident surface is formed inclined as described above, the plurality of incident optics 210 may be disposed in a stepwise manner from the first side to the second side based on an inclined shape of the incident surface.

As a result, the plurality of incident optics 210 may be disposed to protrude in the direction of the light source toward one side. Accordingly, an optical axis Ax2 of the plurality of incident optics may be formed parallel to the optical axis Ax1 of the light source or the parallel light that is the light incident on the incident surface of the first light transmitting unit 220. The reason for this formation will be described later in detail.

An emitting surface of the first light transmitting unit 220 may also be formed to be inclined corresponding to the incident surface thereof. In the second optical member 300, a plurality of emitting optics 310 may be formed on an emitting surface for emitting the light incident from the first optical member 200, and the plurality of emitting optics 310 may be disposed on an emitting surface of the second light transmitting unit 320 of the second optical member 300. Further, in order to correspond to the incident surface of the first light transmitting unit 220, the first side of the emitting surface of the second light transmitting unit 320 may be formed to be closer to the light source unit 100 than the second side to allow the emitting surface of the second light transmitting unit 220 to be inclined. However, the present disclosure is not limited thereto, and the second light transmitting unit 320 may be parallel to the light source unit 100.

The plurality of emitting optics 310 may be made of a material through which light is transmitted. As described above, in an example, the plurality of emitting optics 310 may be disposed on the emitting surface of the second light transmitting unit 320 from which light is emitted. The plurality of emitting optics 310 may be formed integrally with the second light transmitting unit 320, or alternatively, may be formed separately from the second light transmitting unit 320 and disposed or coupled on a surface where light is emitted in the second light transmitting unit 320.

In an exemplary embodiment of the present disclosure, the first light transmitting unit 220 and the second light transmitting unit 320 may be disposed to allow their facing surfaces to abut each other. However, the present disclosure is not limited thereto, and the first light transmitting unit 220 and the second light transmitting unit 320 may be spaced apart from each other by a predetermined distance to diffuse light.

In an exemplary embodiment of the present disclosure, each of the plurality of incident optics 210 may be the substantially semi-cylindrical lens that extends in the horizontal (e.g., left-and-right) direction. Therefore, in an example, the light emitted from one of the plurality of incident optics 210 may be incident on multiple emitting lenses of the plurality of emitting optics 310 disposed in an extending direction of the substantially semi-cylindrical lens. In an exemplary embodiment of the present disclosure, the light emitted from each of the plurality of incident optics 210 may be incident on at least two or more of the plurality of emitting optics 310.

In an exemplary embodiment of the present disclosure, the plurality of incident optics 210 and the plurality of emitting optics 310 may correspond one-to-one. However, the present disclosure is not limited thereto, and the plurality of incident optics 210 and the plurality of emitting optics 310 may correspond to each other in one-to-many, many-to-one, or many-to-many depending on their shapes. By allowing the light emitted from each of the plurality of incident optics 210 to be incident on at least two or more emitting optics of the plurality of emitting optics 310, the spread characteristic of a beam pattern formed by the vehicle lamp of the present disclosure as described above may be improved.

In particular, in the plurality of emitting optics 310, similar to the plurality of incident optics 210, at least one emitting optic 310 disposed in the horizontal direction forms a row in the horizontal direction, and the row in the horizontal direction may be arranged in the vertical (e.g., up-and-down) direction. When the emitting surface is formed to be inclined as described above, the plurality of emitting optics 310 may be disposed in a stepwise manner from the first side of the emitting surface of the second light transmitting unit 320 to the second side based on an inclined shape of the incident surface. As a result, the plurality of emitting optics 310 may be disposed to protrude toward a forward direction.

An optical axis Ax3 of the plurality of incident optics 310 may be formed parallel to the optical axis Ax1 of the light source or the parallel light that is the light incident on the incident surface of the second light transmitting unit 320. Accordingly, the optical axis Ax2 of the plurality of incident optics 210 and the optical axis Ax3 of the plurality of emitting optics 310 may be formed at a same position, to allow the plurality of incident optics 210 and the plurality of emitting optics 310 to correspond one-to-one. However, the present disclosure is not limited thereto, as described above.

Figure 7:
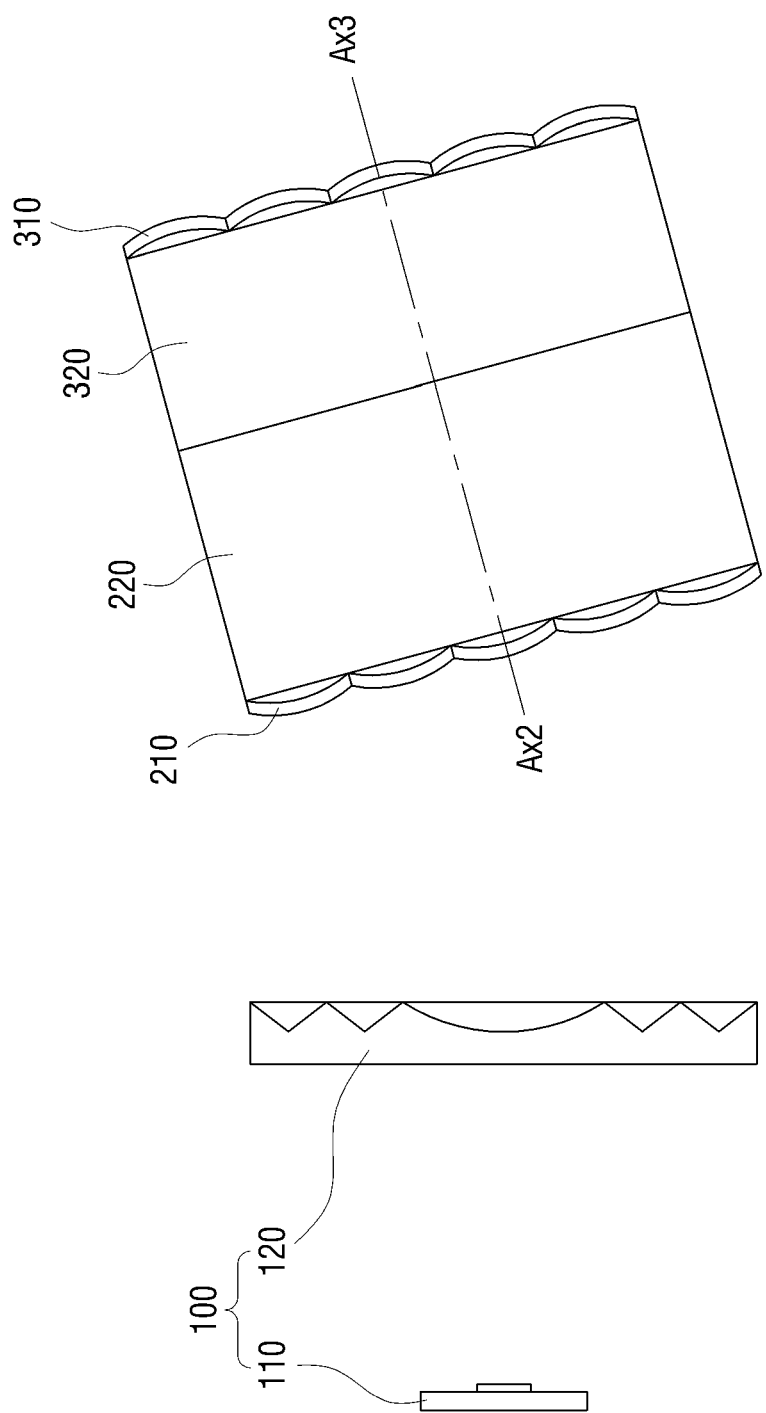
FIG. 7 is a view illustrating that optical axes of incident optics and emitting optics are formed inclined.

By disposing the plurality of incident optics 210 and the plurality of emitting optics 310 in the stepwise manner to allow the optical axis Ax2 of the incident optics and the optical axis Ax3 of the emitting optics to be parallel to the optical axis Ax1 of the light source 110, the beam pattern may be formed more efficiently. For example, as shown in FIG. 7, when the incident optics 210 and the emitting optics 310 are disposed based on a shape of the emitting surface of the inclined first light transmission portion 220 and the incident surface of the inclined second light transmission portion 320, the optical axis Ax2 of the incident optics 210 and the optical axis Ax3 of the emitting optics 310 are formed to be inclined, and thus, the beam pattern is formed inefficiently.

Figure 8:
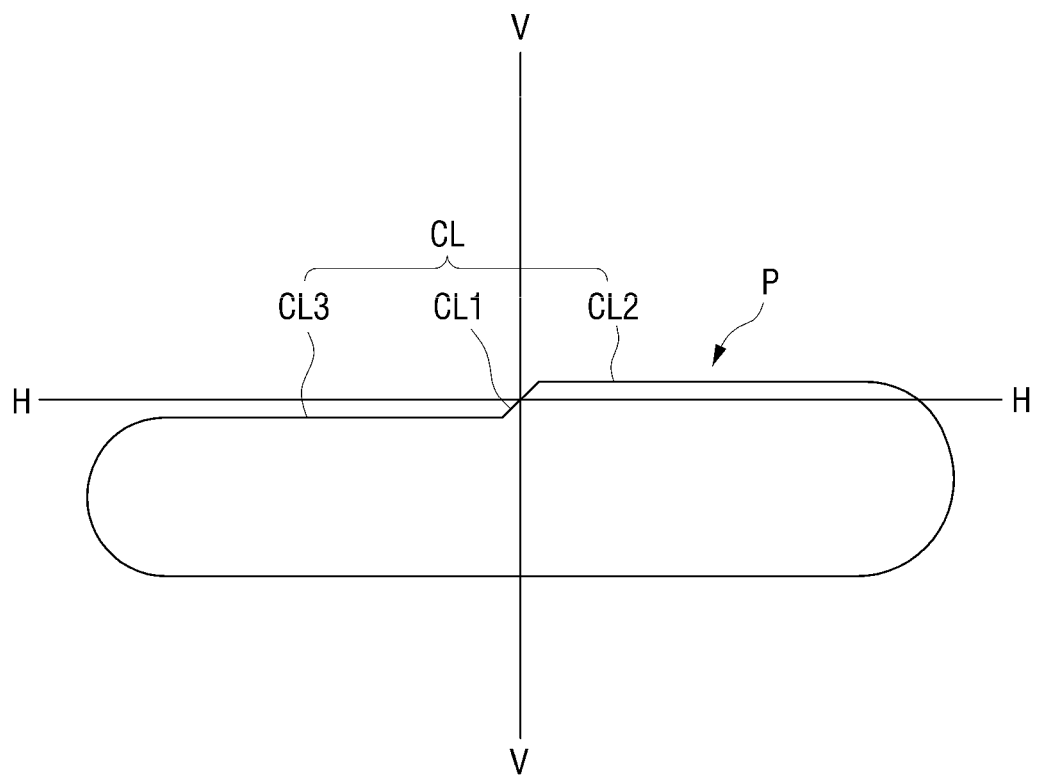
FIG. 8 is a view showing a beam pattern of a vehicle lamp according to an exemplary embodiment of the present disclosure.

The shield unit 400 may be disposed between the plurality of incident optics 210 and the plurality of emitting optics 310, and may obstruct a part of light incident on the plurality of emitting optics 310 to form a cutoff line CL of a low beam pattern Pin FIG. 8. In particular, the cutoff line CL of the low beam pattern P may include an inclined line CL1, an upper line CL2 that corresponds to a driving lane, and a lower line CL3 that corresponds to an opposite lane.

The shield portion 400 may include a plurality of shields 410 formed on either an emitting surface of the first light transmitting unit 220 or an incident surface of the second light transmitting unit 320. For example, the plurality of shields 410 may be formed in a film form and attached to one of the first light transmitting unit 220 and the second light transmitting unit 320. In addition, the shield part 400 including the plurality of shields 410 may be separately provided between the first light transmitting unit 220 and the second light transmitting unit 320.

Each of the plurality of shields 410 may obstruct a part of light incident on each of the plurality of emitting optics 310 to form a cutoff line of the beam pattern. Each upper end of the plurality of shields 410 may include an inclined edge 411 configured to form the inclined line CL1, a first edge 412 configured to form the upper line CL2, and a second edge 413 configured to form the lower line CL3 2, as shown in FIG. 8. In particular, positions of the first edge 412 and the second edge 413 and positions of the upper line CL2 and the lower line CL3 may be inverted. This is because when an aspheric lens is used as the plurality of emitting optics 310, light that is incident on and emitted from the plurality of emitting optics 310 may form an inverted image.

The plurality of shields 410 may be disposed to form a row in the horizontal direction similarly to the plurality of incident optics 210 and the plurality of emitting optics 310, in which the row in the horizontal direction may be arranged in the vertical direction.

Figure 9:
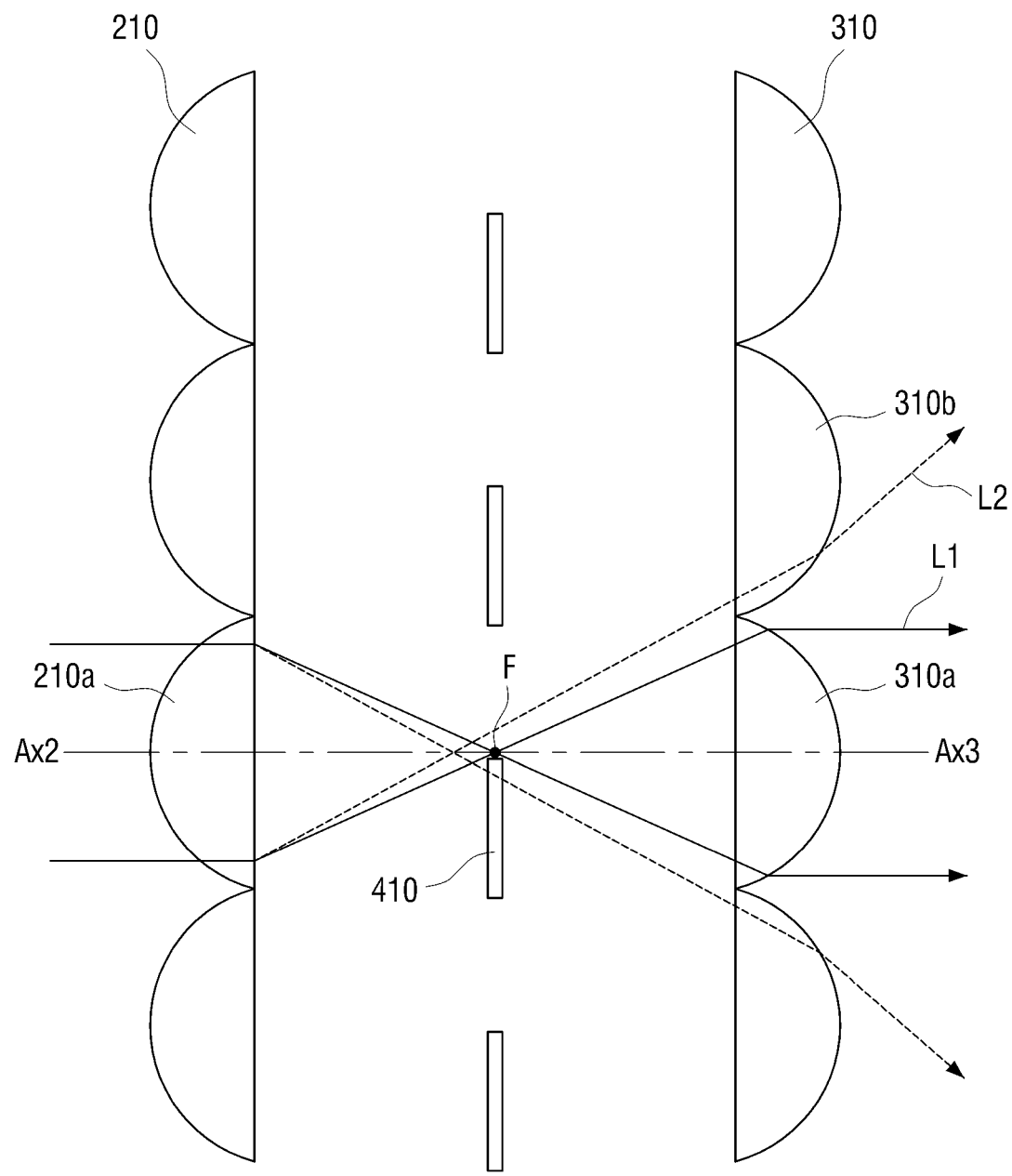
FIGS. 9 and 10 are views illustrating incident optics, emitting optics, and a shield according to an exemplary embodiment of the present disclosure.
Figure 10:
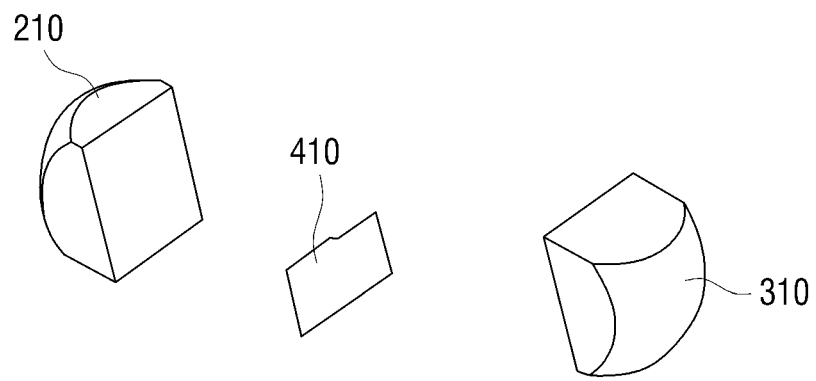
Figure 11:
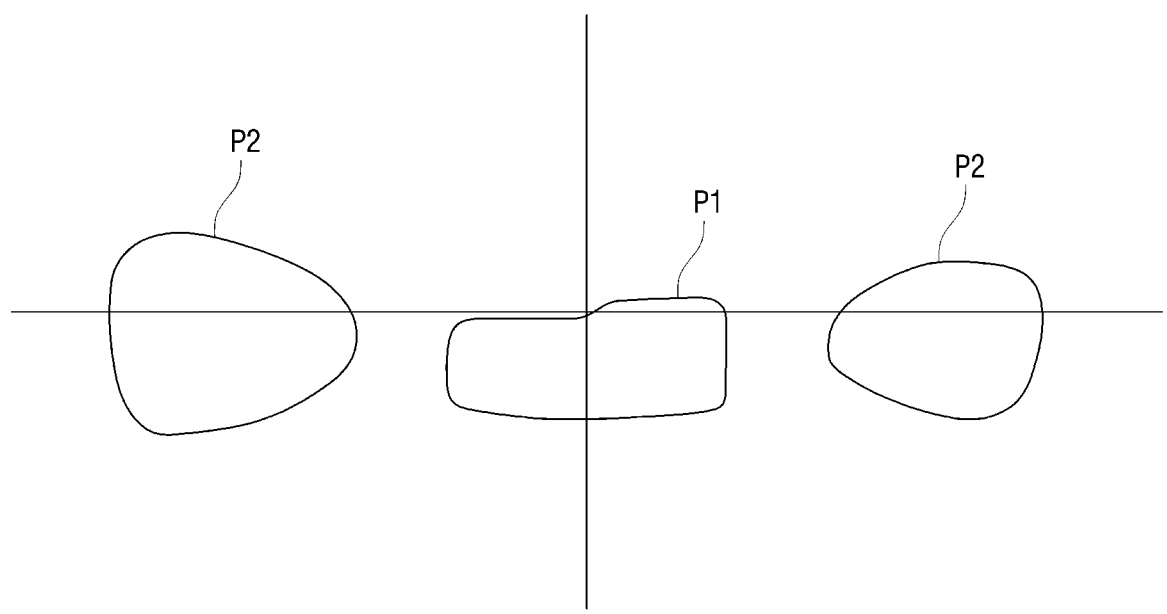
FIG. 11 is a view illustrating a central region and a spread region of a beam pattern formed by first light and second light incident on a first incident optic of the present disclosure.

Further, referring to FIGS. 9 and 10, each upper end of the plurality of shields 410 may be disposed at a focal point F or the vicinity of the focal point F of the plurality of emitting optics 310. Therefore, first light L1 incident on the first incident optic 210a of the plurality of incident optics 210 may pass through the focal point F or the vicinity of the focal point F and may be emitted from the first emitting optic 310a disposed on the optical axis Ax2 of the first incident optic 210a of the plurality of emitting optics 310. In addition, second light L2 incident on the first incident optic 210a may be emitted from at least one second emitting optic 310b proximate to the first emitting optic 310a. Accordingly, as shown in FIG. 11, as the first light L1 is irradiated to a central region P1 of the beam pattern P and the second light L2 is irradiated to a spread region P2 of the beam pattern P, the spread characteristic of the beam pattern P may be improved, as described above.

Figure 12:
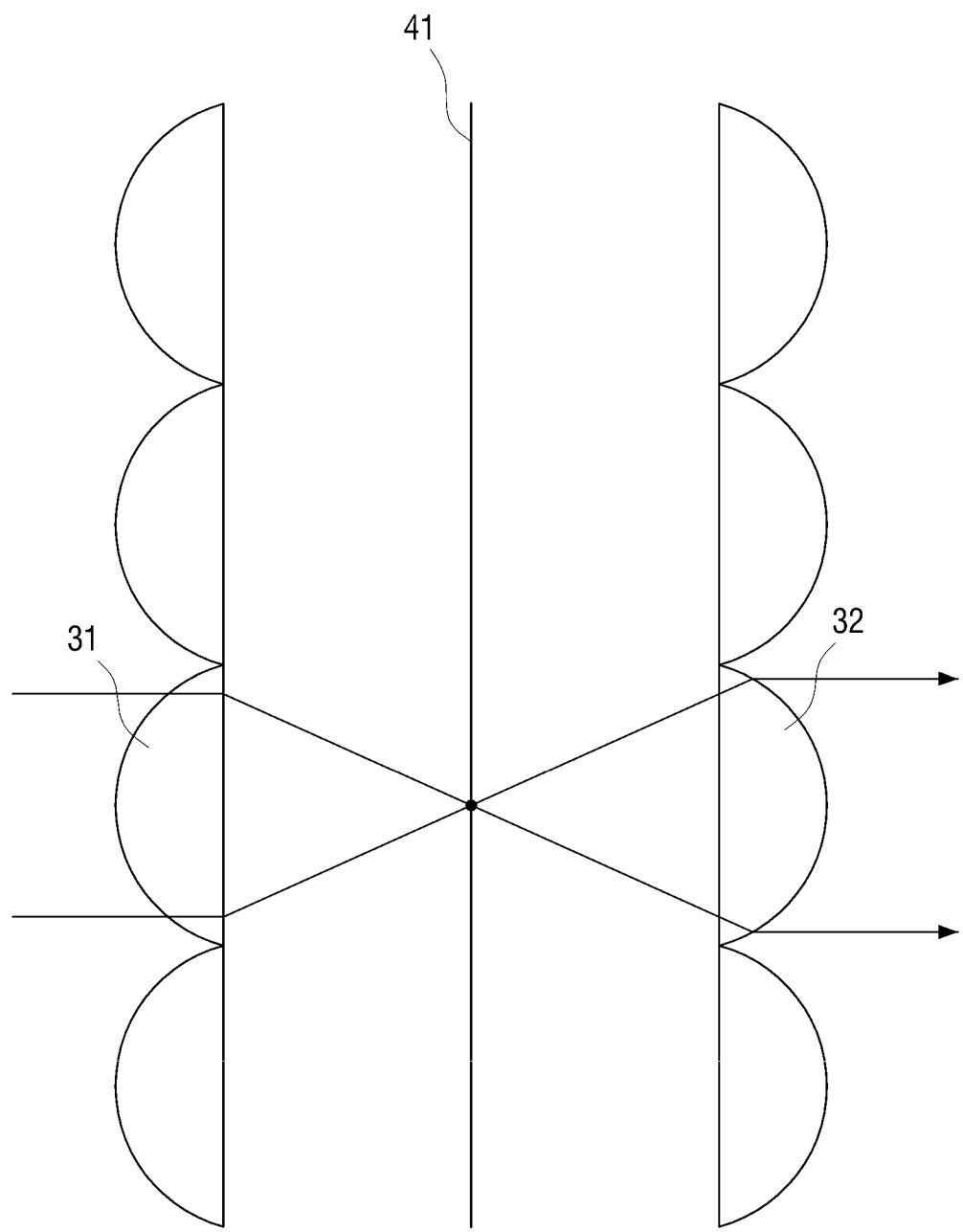
FIGS. 12 and 13 are views illustrating conventional incident optics, emitting optics, and a shield of related art.
Figure 13:
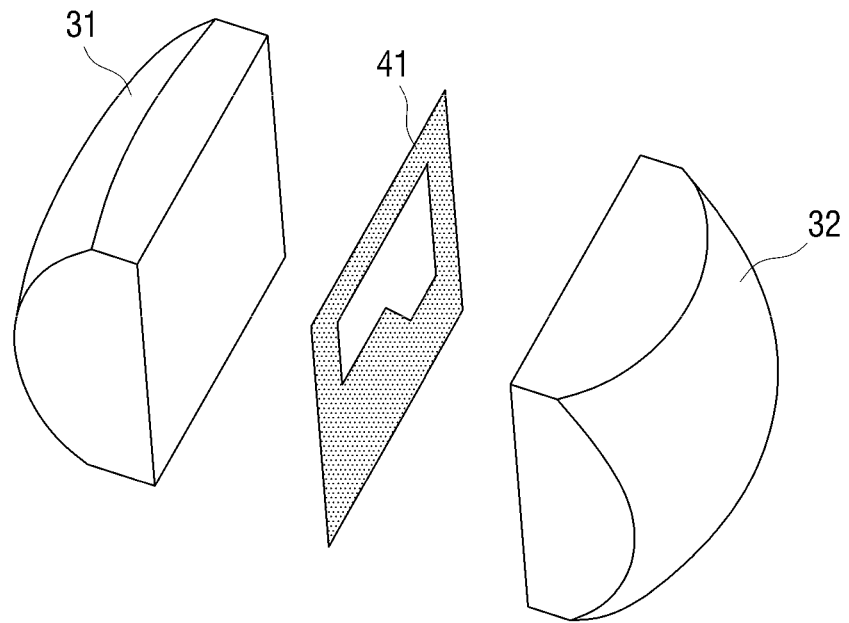
Figure 14:
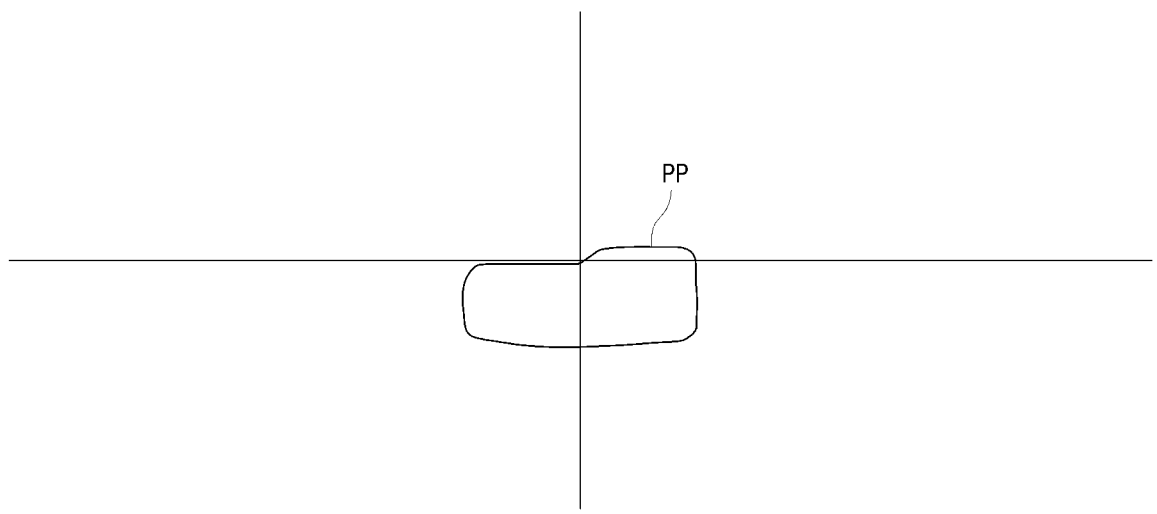
FIG. 14 is a view illustrating a conventional beam pattern formed by a light emitted from a conventional emitting optic of related art.

Conventionally, as shown in FIGS. 12 and 13, a shield 41 of related art is provided between a conventional incident optic 31 and a conventional emitting optic 32, which configuration prevents a path of the second light L2 of the present disclosure from forming. Specifically, the conventional shield 41 is formed in a shape that shields all of the upper, lower, left, and right sides except the portion for forming a cutoff line of a conventional beam pattern. Accordingly, the light incident on the conventional incidence optic 31 is emitted only by the conventional emitting optic 32 disposed on an optical axis of the conventional incidence optic 31 by the conventional shield 41, and is irradiated to a central region PP of the conventional beam pattern as shown in FIG. 14.

Unlike the related art, in the present disclosure, the plurality of shields 410 may be formed and arranged by the inclined edge 411, the first edge 412, and the second edge 413 to form a second optical path. Further, the present disclosure may improve the spread characteristic of the beam pattern P and form the beam pattern P more efficiently than in the related art.

Figure 15:
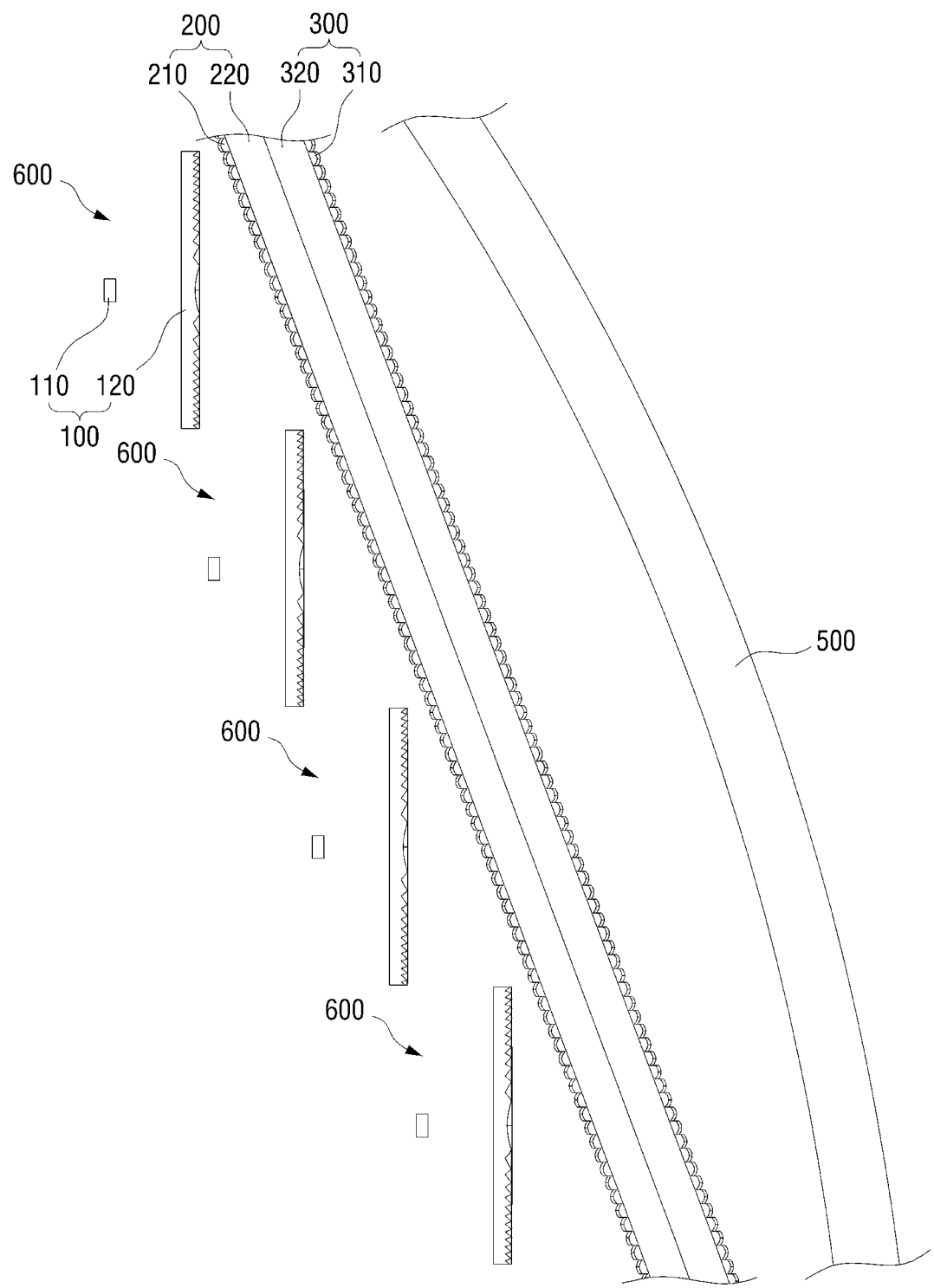
FIG. 15 is a view illustrating a lamp unit and an outer optical member according to an exemplary embodiment of the present disclosure.

Referring to FIG. 15, the vehicle lamp according to an exemplary embodiment of the present disclosure may further include an outer optical member 500, in which the light source unit 100, the first optical member 200, the second optical member 300, and the shield unit 400 may be formed into a lamp unit 600. The outer optical member 500 may be an optical member through which light formed in the light source unit 100 finally transmits, and may be provided in front of the lamp unit. Accordingly, the light emitted from the lamp unit 600 may pass through the outer optical member 500 to form the beam pattern P. The outer optical member 500 may be formed of a lens, a mirror, a prism, or the like, and may be formed in various shapes. For example, as shown in FIG. 15, the outer optical member 500 may be formed to have a curvature.

Further, at least one lamp unit 600 may be provided behind the outer optical member 500. Therefore, although the plurality of lamp units 600 are arranged in the rearward based on the curvature of the outer optical member 500, since the incident surface of the first light transmitting unit 220 and the emitting surface of the second light transmitting unit 320 are inclined as described above, the incident surface of first light transmitting unit 220 and the emitting surface of the second light transmitting unit 320 may be arranged with a high sense of unity and may form a uniform lighting image. The angle at which the incident surface of the first light transmitting unit 220 and the emitting surface of the second light transmitting unit 320 included in the plurality of lamp units are inclined may also be determined based on a shape of the outer optical member 500.

Further, although the upper side of the incident surface of the first light transmitting unit 220 and the upper side of the emitting surface of the second light transmitting unit 220 are shown to be closer to the light source unit 100 than the lower sides thereof in the drawings of the present disclosure, the present disclosure is not limited thereto, and the lower sides may be formed to be closer to the light source unit 100 than the upper sides to conform a shape of the outer optical member 500.

As another example, the outer optical member 500 may be formed in a substantially circular shape. In this case, the upper side of the incident surface of the first light transmitting unit 220 and the upper side of the emitting surface of the second light transmitting unit 320 included in some lamp units of the plurality of lamp units 600 may be formed to be closer to the light source portion 100 than the lower sides thereof. The lower side of the incident surface of the first light transmitting unit 220 and the lower side of the light emitting surface of the second light transmitting unit 320 included in the remaining lamp unit may be formed to be closer to the light source unit 100 than the upper sides thereof. Based on the shape of the outer optical member 500, some of the lamp units may be disposed behind the outer optical member 500, and then the remaining lamp units may be disposed.

An inclination of the incident surface of the first light transmitting unit 220 and the emitting surface of the second light transmitting unit 320 of each of the plurality of lamp units may also be different from each other based on the shape of the outer optical member 500. It is described that the incident surface of the first light transmitting unit 220 and the emitting surface of the second light transmitting unit 320 are inclined only vertically (e.g., upward and downward). However, the present disclosure is not limited thereto, and the incident surface of the first light transmitting unit 220 and the emitting surface of the second light transmitting unit 320 may also be inclined in the horizontal (e.g., left-and-right) direction or the like based on the shape of the outer optical member. As a result, the inclined direction and the inclination of the incident surface of the first light transmitting unit 220 and the emitting surface of the second light transmitting unit 320 included in each of the plurality of lamp units 600 may be determined differently from each other based on the shape of the outline optical member 500.

A skilled in the art may recognize that the present disclosure may be embodied in other specific forms without departing from the spirit or essential characteristics thereof. Therefore, it is to be understood that the above-described exemplary embodiments are illustrative in all aspects and not restrictive. The scope of the invention is indicated by the appended claims rather than the foregoing detailed description. It should be interpreted that the present disclosure covers the modifications and variations derived from the meaning and scope of the appended claims and their equivalents.

What is claimed is:

1. A vehicle lamp, comprising:
   a light source unit for generating light;
   a first optical member in which a plurality of incident optics are disposed on an incident surface on which light is incident from the light source unit;
   a second optical member in which a plurality of emitting optics are disposed on an emitting surface through which light emitted from the first optical member is incident and emitted; and
   a shield unit disposed between the plurality of incident optics and the plurality of emitting optics,
   wherein the first optical member and the second optical member are tilted with respect to an optical axis of the light source unit such that a first side of the incident surface and the emitting surface is formed to be closer to the light source unit than a second side of the incident surface and the emitting surface, and
   wherein the plurality of incident optics and the plurality of emitting optics are disposed respectively on the incident surface and the emitting surface, which are tilted with respect to the optical axis of the light source unit, in a stepwise manner from the first side toward the second side while optical axes of each of the plurality of incident optics and each of the plurality of emitting optics are parallel with the optical axis of the light source unit.

2. The vehicle lamp of claim 1, wherein each of the plurality of incident optics is formed as a semi-cylindrical lens, and an area of the each of the plurality of incident optics is substantially same as a sum of areas of at least two of the plurality of emitting optics such that light emitted from the each of the plurality of incident optics is incident on the at least two of the plurality of emitting optics.

3. The vehicle lamp of claim 2, wherein the light source unit comprises:
   a light source for generating the light; and
   a light guide for forming the light generated from the light source to be a parallel light.

4. The vehicle lamp of claim 2, wherein the first optical member comprises a first light transmitting unit in which the plurality of incident optics are disposed on the incident surface, and the second optical member comprises a second light transmitting unit in which the plurality of emitting optics are disposed on the emitting surface.

5. The vehicle lamp of claim 2, wherein an optical axis of the incident optics and an optical axis of the emitting optics are formed to correspond to each other.

6. The vehicle lamp of claim 2, wherein an optical axis of the incident optics and an optical axis of the emitting optics are formed parallel to a traveling direction of the light incident on the incident surface.

7. The vehicle lamp of claim 2, further comprising:
   at least one lamp unit including the light source unit, the first optical member, and the second optical member; and
   an outer optical member in which light emitted from the lamp unit is incident.

8. The vehicle lamp of claim 1, wherein the light source unit comprises:
   a light source for generating the light; and
   a light guide for forming the light generated from the light source to be a parallel light.

9. The vehicle lamp of claim 8, wherein the light guide is formed of a Fresnel lens.

10. The vehicle lamp of claim 1, wherein the plurality of incident optics and the plurality of emitting optics are disposed to form a row in a horizontal direction, the row in the horizontal direction being disposed in a vertical direction.

11. The vehicle lamp of claim 1, wherein the first optical member comprises a first light transmitting unit in which the plurality of incident optics are disposed on the incident surface, and the second optical member comprises a second light transmitting unit in which the plurality of emitting optics are disposed on the emitting surface.

12. The vehicle lamp of claim 11, wherein the first light transmitting unit and the second light transmitting unit are disposed to allow facing surfaces thereof to abut each other.

13. The vehicle lamp of claim 11, wherein the shield unit comprises a plurality of shields formed on an emitting surface of the first light transmitting unit or on an incident surface of the second light transmitting unit.

14. The vehicle lamp of claim 13, wherein each of the plurality of shields comprises:
   an inclined edge having a lower end and an upper end;
   a first edge that extends from the lower end of the inclined edge; and
   a second edge that extends from the upper end of the inclined edge.

15. The vehicle lamp of claim 1, wherein light emitted from each of the plurality of incident optics is incident on at least two of the plurality of emitting optics.

16. The vehicle lamp of claim 1, wherein an optical axis of the incident optics and an optical axis of the emitting optics are formed to correspond to each other.

17. The vehicle lamp of claim 1, further comprising:
   at least one lamp unit including the light source unit, the first optical member, and the second optical member; and an outer optical member in which light emitted from the lamp unit is incident.

18. The vehicle lamp of claim 17, wherein an inclination angle and inclined direction of the incident surface and the emitting surface are determined based on a shape of the outer optical member.

\* \* \* \* \*